United States Patent [19]

Jang

[11] Patent Number: 5,280,516

[45] Date of Patent: Jan. 18, 1994

[54] PAGING SYSTEM FOR AUTOMATICALLY DIALING AND METHOD THEREFOR

[75] Inventor: Jong-Jin Jang, Suwon, Rep. of Korea

[73] Assignee: SamSung Electronics Co., Ltd., Suwon, Rep. of Korea

[21] Appl. No.: 744,932

[22] Filed: Aug. 14, 1991

[30] Foreign Application Priority Data

Jan. 19, 1991 [KR] Rep. of Korea ............ 1991-885

[51] Int. Cl.⁵ ............................................. H04M 11/00
[52] U.S. Cl. .................................. 379/57; 379/354; 379/355
[58] Field of Search ............... 379/56, 57, 354, 355, 379/58; 455/344

[56] References Cited

U.S. PATENT DOCUMENTS

| | | | |
|---|---|---|---|
| 4,021,608 | 5/1977 | Brodeur | 455/344 |
| 4,490,579 | 12/1984 | Godoshian | 379/57 |
| 4,707,854 | 11/1987 | Mayer | 379/355 |
| 4,841,561 | 6/1989 | Hill | 379/355 |
| 4,852,146 | 7/1989 | Hathcock et al. | 379/355 |
| 5,099,507 | 3/1992 | Mukai et al. | 379/355 |
| 5,134,653 | 7/1992 | Satomi et al. | 379/354 |
| 5,212,721 | 5/1993 | DeLuca et al. | 379/354 |

FOREIGN PATENT DOCUMENTS 0085459 3/1989 Japan ............................ 379/355

Primary Examiner—Jin F. Ng
Assistant Examiner—Dwayne D. Bost
Attorney, Agent, or Firm—Robert E. Bushell

[57] ABSTRACT

A paging receiver for automatically dialing a stored telephone number can consider an area code. A received telephone number stored into a memory corresponding to a number of depressions of a read key is displayed when the read key is depressed, and an area code stored into the memory corresponding to the number of depressions of an area key is displayed when the area key is depressed. Then, when the area code and the telephone number are displayed, an unnecessary extension number, etc., is erased by using an editing key. Thereafter, the area code and the telephone number are converted into a DTMF signal when a dial key is depressed and the DTMF signal is applied to an electronic exchange through a telephone, thereby performing automatic dialing.

23 Claims, 4 Drawing Sheets

PAGING SYSTEM FOR AUTOMATICALLY DIALING AND METHOD THEREFOR

BACKGROUND OF THE INVENTION

The present invention relates to a paging system having an automatic dialing function, and more particularly to a paging system which can automatically dial a telephone number including an area code.

Generally, in a compact paging receiver, an alert tone is generated in response to a radio calling signal remotely received and, a telephone number of a caller is transmitted with the alert tone. Data applied to the paging receiver has a specific code form, such as a POCSAG (Post Office Code Standardization Advisory Group) code. In the POCSAG code, one data batch consists of 8 frames. Each frame consists of an address code word which indicates a specific address of the paging receiver and a message code word to which the telephone number of the caller is conveyed.

FIG. 1 is a block diagram of a conventional paging system and FIG. 2 is a flow chart for showing the function of automatic dialing in the conventional paging system. A control circuit 120 drives a receiver 110 a frame period and the receiver 110 demodulates a received radio frequency signal to shape a waveform thereof and applies the shaped signal to the control circuit 120. The control circuit 120 is a one chip microprocessor unit which has a program ROM (Read Only Memory), a RAM (Read Access Memory) 121 for storing received data and a DTMF (Dual Tone Multi-Frequency) generator 122 for generating the stored data as a DTMF signal.

When the control circuit 120 is supplied with data from the receiver 110, the control circuit 120 checks whether the data is data of the paging receiver by analyzing the address code word. If the data is data of the paging receiver, the control circuit 120 stores the telephone number of the message code word into the RAM 121 by the use of a memory key 140. When a user makes a phone call under the above condition that the telephone number is stored in the RAM 121, the user depresses a read key 150. In this case, the control circuit 120 detects the depression of the read key 150 in a step 202, reads from the RAM 121 the telephone number corresponding to the number of depressing the read key 150 and displays the telephone number on a LCD (Liquid Crystal Display) 130, through steps 204, 206 and 208 as shown in FIG. 2. Thereafter, if the user confirms the telephone number and depresses a dial key 160, the control circuit 120 detects the depression of the dial key 160 in a step 210 and converts the telephone number displayed on the LCD 130 into the DTMF signal through the DTMF generator 122. FIG. 1 shows a speaker 170 which generates the DTMF signal as a DTMF tone. The speaker 170 has to be located beside a transmitter of an electronic exchange, and the DTMF tone output from the speaker 170 is applied to the electrical exchange through a telephone transmitter. Therefore, the user dials a telephone number using the paging receiver without performing a conventional dialing operation.

The above system has shortcomings. Since the area code of a caller or the current place of a user, etc. were not considered, when using the area code, if the user performs automatic dialing with the received telephone number, the telephone call is errant. Therefore, the loss of time occurs because the user must use keys of the telephone without using an automatic dial. Also, when an extension number of the caller in the received telephone number is included, if there is no an editing function, an unnecessary DTMF signal is generated when performing automatic dialing. Further, if power to the paging receiver is turned off, the stored telephone numbers are erased, requiring manual reinput of telephone numbers.

SUMMARY OF THE INVENTION

It is therefore an object of the present invention to provide an apparatus and method thereof which can generate a DTMF signal considering a telephone number including an area code when performing an automatic dialing in a paging receiver.

It is another object of the present invention to provide an apparatus and method thereof which can generate a DTMF signal after editing and a telephone number when performing an automatic dialing in a paging receiver.

It is a further object of the present invention to provide an apparatus and method thereof which can maintain a received telephone number in memory even if power to the paging receiver is turned off.

According to one aspect of the present invention, the paging receiver for automatically dialing displays a received telephone number stored in the memory corresponding to the number of depressing a read key when the read key is depressed. An area code stored in the memory corresponding to the number of depressing an area key is displayed when the area key is depressed, and an unnecessary extension number for automatically dialing is erased by an editing key. Then, the area code and the telephone number are converted into a DTMF signal when a dial key is depressed and the DTMF signal is applied to an electronic exchange through a telephone, performing an automatic dialing function.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

Figure 1:
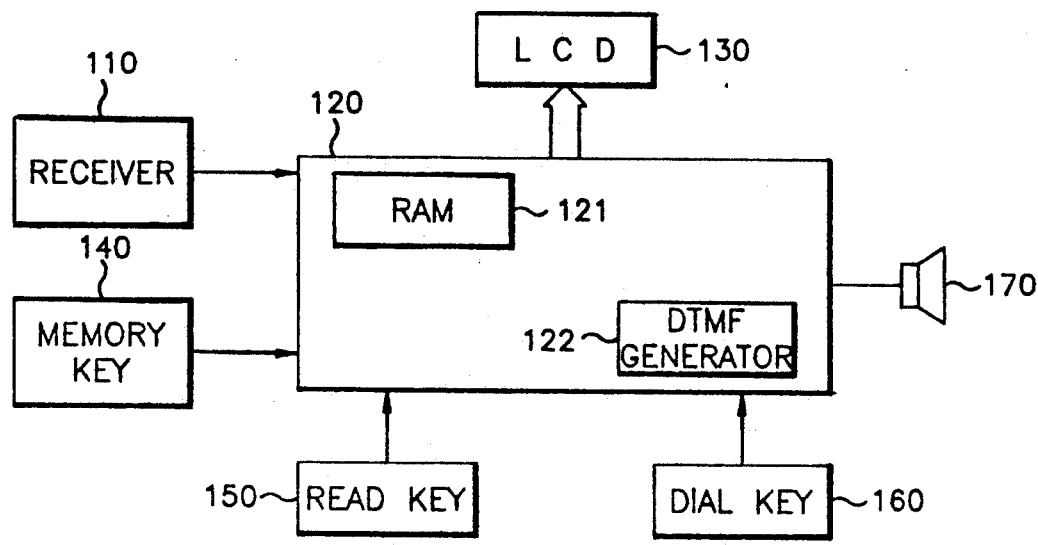
FIG. 1 is a schematic block diagram for showing a conventional paging system.
Figure 3:
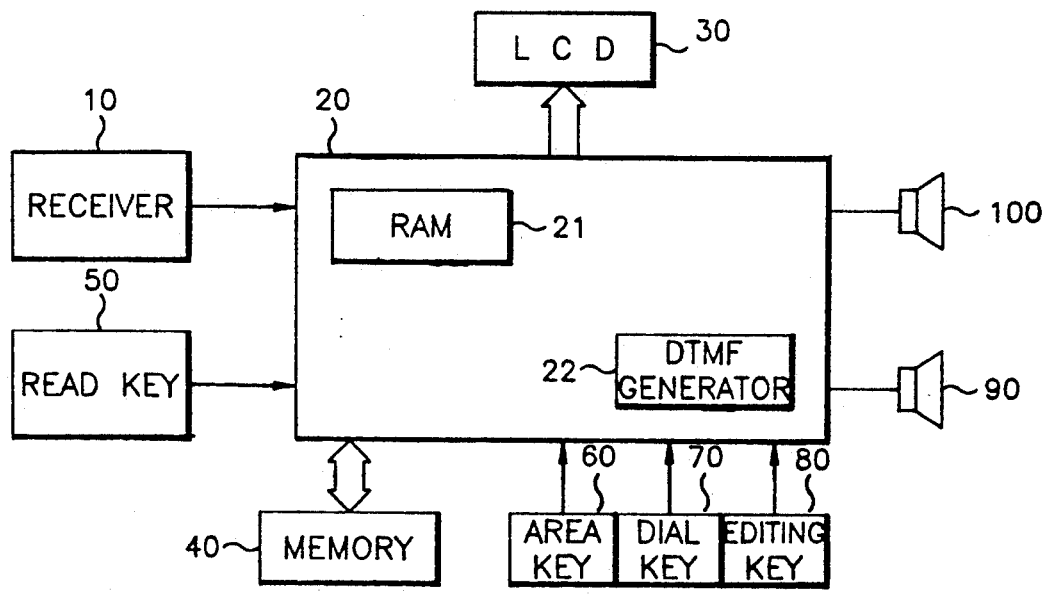
FIG. 3 is a schematic block diagram for showing a paging system according to the present invention.
Figure 2:
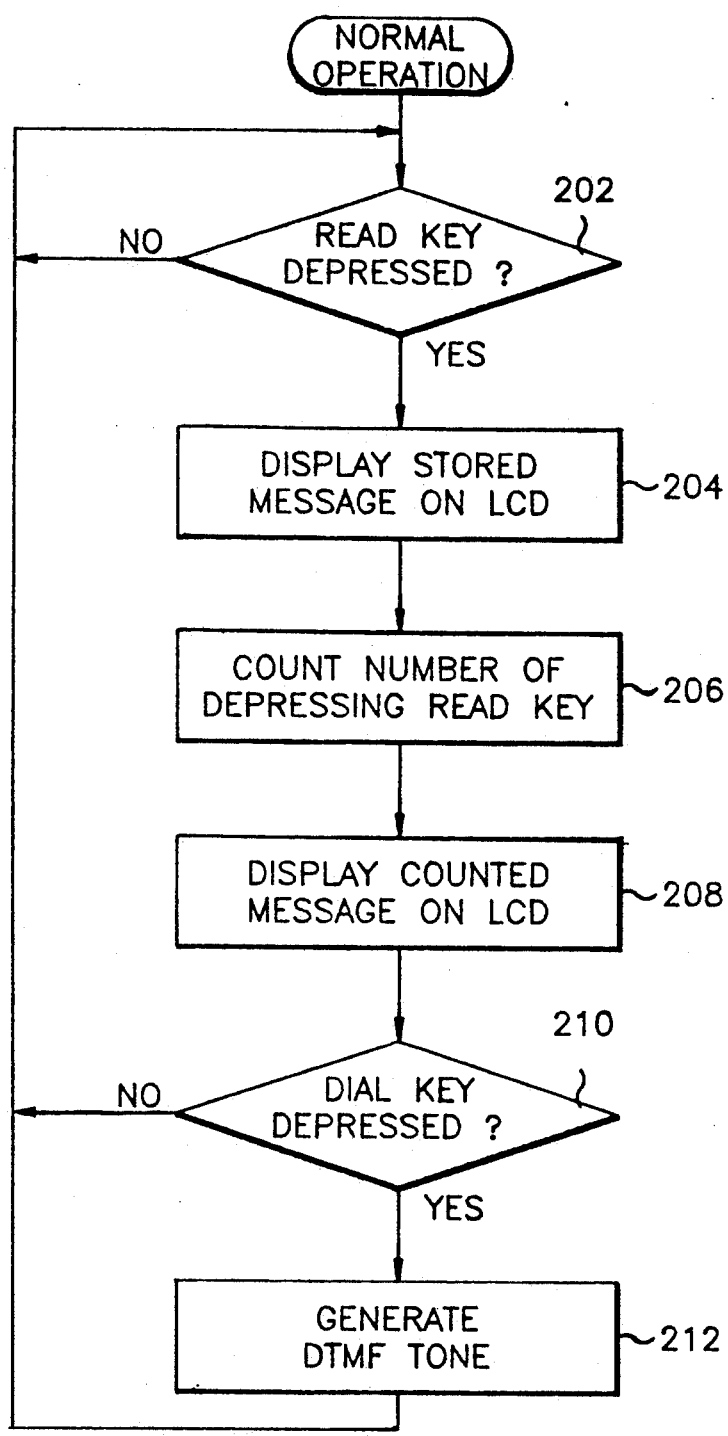
FIG. 2 is a flow chart for describing the method of automatic dialing in the conventional paging system of FIG. 1.

Referring to FIG. 3, a receiver 10 demodulates a radio frequency signal to shape a waveform thereof and thereafter, convert the shaped signal into a digital signal. A control circuit 20 which controls operation of a paging receiver, includes a DTMF generator 22 for converting a transmitting telephone number into a DTMF signal and a RAM 21 for storing a received telephone number. A LCD 30 displays the received telephone number from the control circuit 20. A memory 40 which is an EEPROM (Electrically Erasable and Programmable Read Only Memory) stores first and second addresses of the paging receiver in a first area, telephone numbers in a second area and area codes in a third area. A read key 50 and an area key 60 supplies key instructions to the control circuit 20 so as to successively select the telephone numbers stored in the second area of the memory 40 and the area codes stored in the third area of the memory 40, respectively. A dial key 70 supplies a key instruction to the control circuit 20 so as to generate the selected area code and telephone number as a DTMF signal by driving the DTMF generator 22. An editing key 80 supplies a key instruction to the control circuit 20 so as to erase unnecessary extension numbers for dialing except for the area code and the telephone number. A speaker 90 generates the DTMF signal output from the DTMF generator 22 in the control circuit 20 as a DTMF tone, and a buzzer 100 generates an alert signal output from the control circuit 20 as an alert tone.

Figure 4:
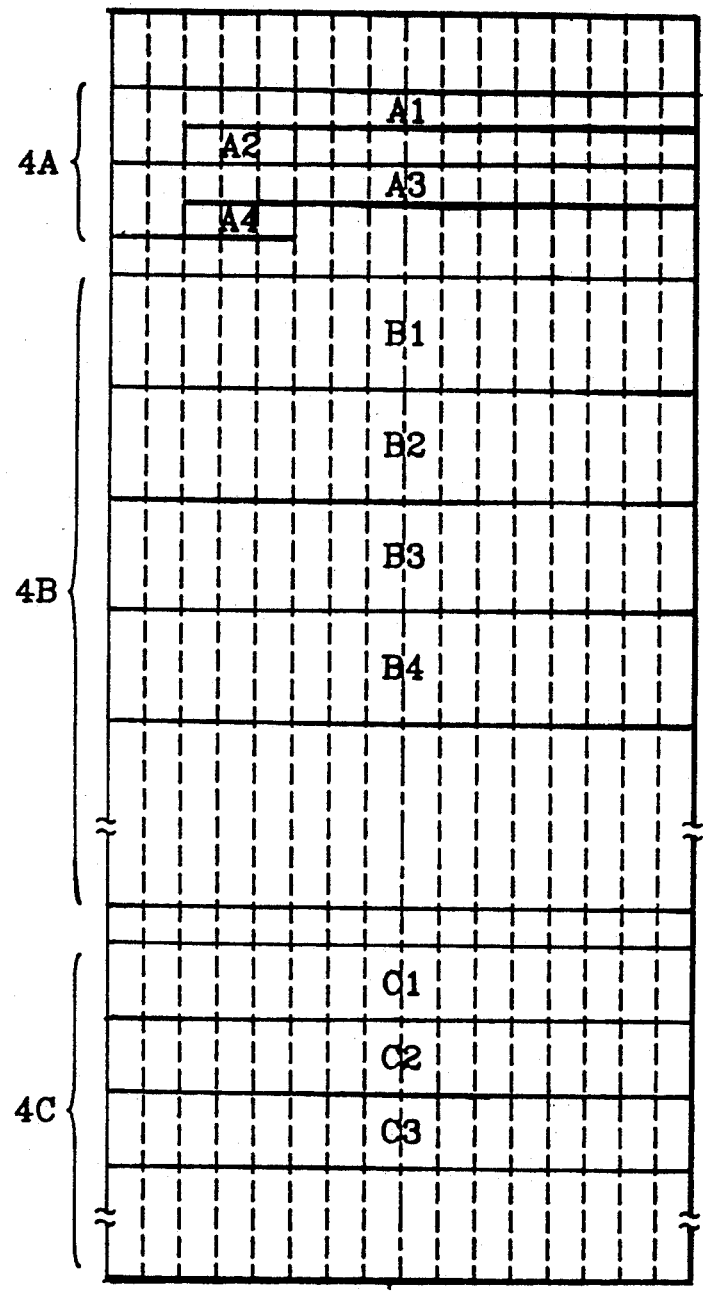
FIG. 4 is a map diagram of a memory 40 of FIG. 3.

Referring to FIG. 4, a first area 4A is an area for storing the first and second paging receiver addresses. A second area 4B is an area for storing telephone numbers stored in the RAM 21 up to 12 digits. A third area 4C is an area for storing area codes.

Figure 5:
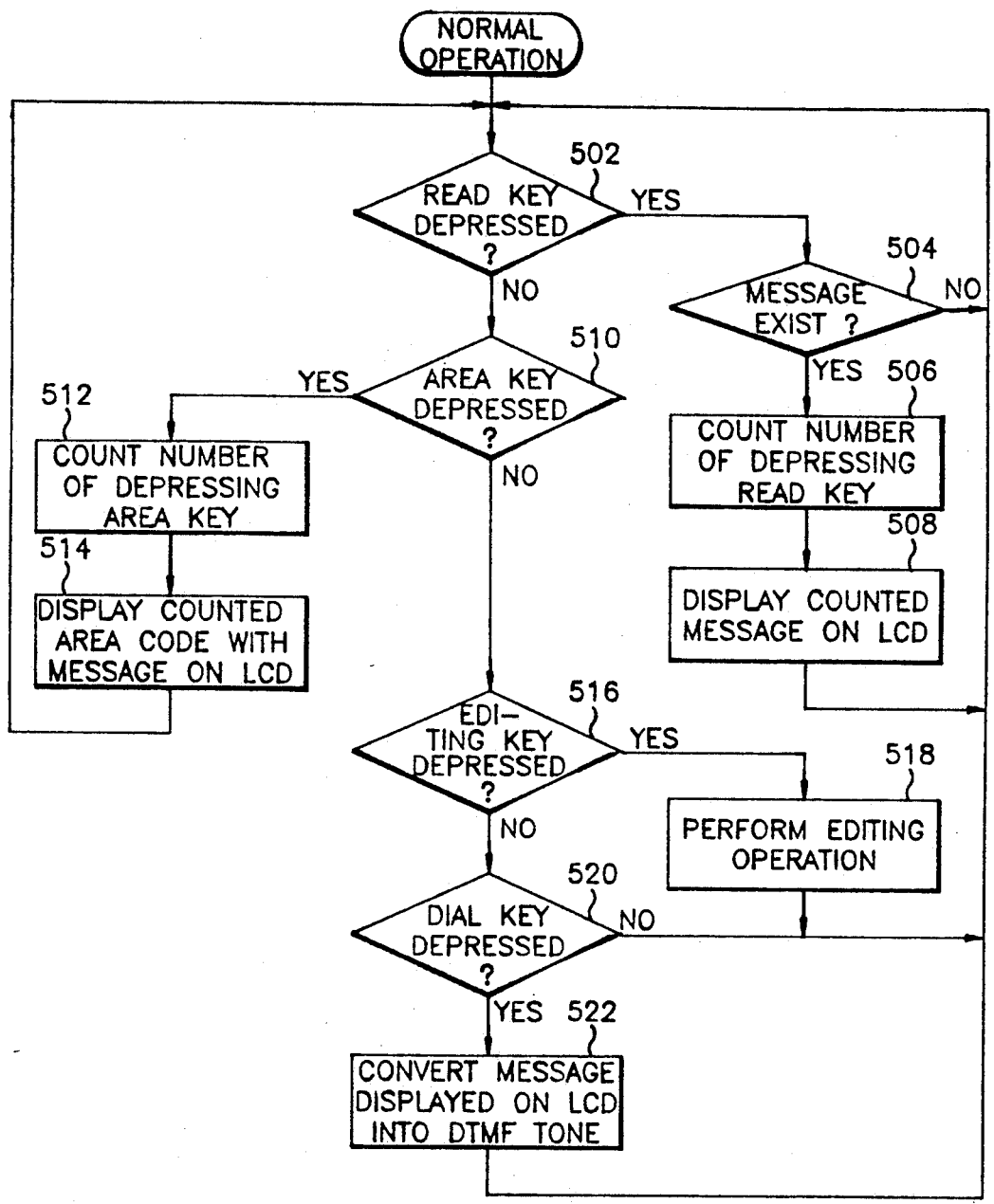
FIG. 5 is a flow chart for describing the method of automatic dialing in a paging system according to the present invention.

Referring to FIG. 5, in a paging system for performing automatic dialing, after performing a normal operation, whether the read key 50 is depressed or not is monitored and the telephone number of the memory corresponding to the number of depressing the read key 50 is displayed if the read key is depressed. Then, whether the area key 60 is depressed or not is monitored and the area code of the memory corresponding to the number of depressing the area key 60 is displayed together with the telephone number if the area key is depressed. Thereafter, whether the editing key 80 is depressed or not is monitored and an unnecessary extension number is erased if the editing key 80 is depressed. The next time, whether the dial key 70 is depressed or not is monitored and the displayed area code and telephone number are successively converted into the DTMF signals if the dial key 70 is depressed.

The present invention will be described in detail with reference to FIGS. 3 to 5.

First, a radio frequency signal applied to a receiver 10 is a POCSAG code a control circuit 20 controls the operation of the receiver 10 so as to receive a radio frequency signal at a frame period. The receiver 10 demodulates the received radio frequency signal to shape a waveform thereof and convert the shaped signal into a digital signal. In this case, the received one frame data consists of an address code word and a message code word. The control circuit 20 receiving a signal output from the receiver 10 compares a specific address of the paging receiver (customer administration penal code; CAP code) stored in the first area 4A of the memory 40 with the received address code word. If they are the same, the control circuit 20 stores the message code word in a predetermined area of the RAM 21 as the received telephone number of a caller, and simultaneously displays the received telephone number on the LCD 30 and notifies a user that a message has been received by driving buzzer 100. Further, the control circuit 20 stores the message in the RAM 21 of the control circuit 20 in the second area 4B of the memory 40 for protecting the received message when power is turned off. The above paging receiver has a plurality of memories which are capable of storing 240 or 360 digits for example, and repeatedly performs the above-mentioned operation in a normal operation mode.

Turning to map of the memory 40 in FIG. 4, the memory 40 uses a commercially available EEPROM and here an EEPROM of 4096 bits (256 words × 16 bits) will be described as an example.

In the first 32 bits area of the first area 4A, first address data of 18 bits such as A1 area and frame data of 3 bits such as A2 area are recorded and, in the second 32 bits area, second address data of 18 bits such as A3 area and frame data of 3 bits such as A4 area are recorded. These addresses recorded in the A1 area and the A3 area are addresses of the paging receiver. Assuming that a CAP code is "0014588", the "quotient" is used as address data and the "remainder" is used as frame data by dividing the CAP code by 8 in the paging system (0014588÷8=1823.5). In the above, the positive number of the quotient, "1823" is used for an address and the decimal fraction thereof, "0.5" multiplied by "8" is used for a frame (0.5×8=4). Therefore, when using the CAP code "0014588" as the first address, "1823" of 18 bits is recorded as the first address of the paging receiver in the A1 area and "4" of 3 bits is recorded as the frame data in the A2 area. The first address is a single address and the second address is a group address which includes the single address.

In the second area 4B, the received telephone numbers are recorded. The received telephone numbers are stored as message in the RAM 21 and, at the same time, are successively recorded in the address area of the second area 4B corresponding to the RAM 21 so as to protect the message even if a power is turned off. In this case, 48 bits which can store 12 digits are assigned in one telephone number area.

In the third area 4C, a plurality of area codes are recorded. The third area 4C is an area for selecting the area code of the caller when performing automatic dialing. The size of the third area 4C accommodates area codes of various digit lengths.

When a user confirms the received telephone number and performs automatic dialing first, the user depresses the read key 50 to confirm the telephone number. Then, the control circuit 20 counts a number of depressions of the read key 50 and displays the telephone number stored in the RAM 21 on the LCD 30. When a desired telephone number is displayed on the LCD 30, the user depresses the dial key 70, then, a DTMF signal is generated through the control circuit 20. The DTMF signal is applied to the telephone transmitter through the speaker 90 and the DTMF tone output from the telephone transmitter is applied to the electronic exchange.

If it is necessary for the user to consider an area code of the telephone number, the user selects a desired telephone number on the LCD 30 by using the read key 50 and depresses the area key 60. Then, the control circuit 20 displays an area code corresponding to the number of depressing the area key 60 together with the telephone number on the LCD 30 by selecting the area code in the third area 4C of the memory 40. Next, if the user depresses the dial key 70, a desired telephone number and an area code are successively generated as the DTMF signal. Further, when the telephone number includes an unnecessary extension number for dialing, the user can erase the extension by using the editing key 80. That is, when quickly depressing the editing key 80 the cursor on the LCD 30 is shifted, and when slowly depressing the editing key 80 after stopping the cursor at a digit location which should be erased, the digit is erased.

Turning to automatic dialing, the control circuit 20, if a key instruction is not sensed, analyzes frame data received through the receiver 10 and successively records contents of message code word at a corresponding address location in the RAM 21 and the second area 4B of the memory 40, when the contents of the address code word coincide with the data of the first address or the second address stored in the first area 4A of the memory 40.

Under the above described normal operation condition, the depression of the read key 50 is sensed, in a step 502, and whether the telephone number stored in the RAM 21 exists or not in a step 504, and if it exists, reads out the finally received telephone number among the stored telephone numbers through a step 506 and displayed on the LCD 30. The user confirms the display of the finally stored message as above described and depresses the read key 50 continuously to select a desired telephone number. Then, the control circuit 20 counts the number of depressions of the read key 50 in step 506 and displays the telephone number of the RAM 21 corresponding to the number of depressions of the read key 50 on the LCD 30 in step 508. Therefore, on the LCD 30, the telephone number from the RAM 21 corresponding to the number of depressions of the read key 50 is displayed whenever the read key 50 is depressed.

If the user should like to send the telephone number displayed on the LCD 30 by automatic dialing, the user must determine whether the telephone number is in a local area code. If the user depresses the area key 60, the control circuit 20 detects the depressed area key in step 510, reads an area code which corresponds to the number of depressions of the area key 60 in the third area 4C of the memory 40 in step 514 after counting the number of depressions of the area key 60 in step 512 and displays the corresponding area code together with the telephone number displayed on the LCD 30. Accordingly, when considering an area code after selecting a desired telephone number by using the read key 50, the user selects the corresponding area code stored in the third area 4C of the memory 40 by using the area key 60, and then, the area code is displayed together with the telephone number on the LCD 30. In this case, on the LCD 30, since a display area of the area code and the telephone number are assigned separately, the displaying location becomes the area code+telephone number.

Furthermore, when an unnecessary extension number is included in the telephone number, the extension number can be removed. As described above, the unnecessary data can be edited using the editing key 80°. If the user quickly depresses the editing key 80 within a predetermined time, then the cursor on the LCD 30 will be shifted, and if a cursor is located at the unnecessary data displayed on the LCD 30 presently, the user can slowly depress the editing key 80 for longer than the predetermined time. Hence, if the control circuit 20 senses the input of the editing key 80 for longer than the predetermined time in step 516, the data to which the cursor is located on the LCD 30 is erased in step 518.

When performing an automatic dialing after erasing unnecessary data (such as an extension number) from the telephone number and the area code, the user depresses the dial key 70. Then, the control circuit 20 senses in a step 520 and converts the telephone number displayed on the LCD 30 into a DTMF signal by driving the DTMF generator 22 in step 522. The DTMF signal output from the DTMF generator 22 is converted to a DTMF tone through the speaker 90 and applied to the exchange through the electronic telephone transmitter.

For performing automatic dialing in a paging receiver, first, the user selects a telephone number to be dialed by using the read key 50 and erase the unnecessary data when adding the area code and performing a dialing by using the area key 60 or the editing key 80. Here, the use of the area key 60 and the editing key 80 does not matter. If a desired telephone number is determined, it is converted to a DTMF signal using the dial key 70, which commences automatic dialing.

Now, assume that the data in the second area 4B and the third area 4C of the memory 40 is as follows in Table 1.

TABLE 1

| | the second area (maximum 12 digits) | the third area (maximum 4 digits) |
|---|---|---|
| 1 | 263-1627 | 00 |
| 2 | 728-8169 | 02 |
| 3 | 568-4345 | 032 |
| 4 | 745-008432 | 0331 |
| 5 | 461-8038 | 0546 |
| 6 | 30-3344 | 0681 |
| . | . | . |

The user for example selects the number of 0331 (an area code)+745 (a telephone office number)+0084 (a telephone number)+32 (an extension number) for automatic dialing. In this case, it is assumed that, in the second area 4B of the memory 40, the telephone number is applied and stored, and, in the third area 4C of the memory 40, the area code is set as shown in Table 1.

First, the user confirms the telephone number stored in the RAM 21 by depressing the read key 50. The telephone number in RAM 21 is the same as the stored telephone number in the second area 4B of the memory 40. Therefore, the control circuit 20 displays the telephone number corresponding to the number of depressions of the read key 50, and, in the "4"the position, the number, 745 - 008432 is displayed on the LCD 30. Then, the user edits the number as the desired telephone number by depressing the area key 60 or the editing key 80. When the user depresses the area key 60, the control circuit 20 displays the corresponding area code of the third area of the memory 40 together with the telephone number on the LCD 30. Therefore, the area code and the telephone number of "0331 745-008432" are displayed on the LCD 30. In this case, since the extension number "32" is unnecessary data for dialing, it should be removed by using the editing key 80. Here, the editing key 80 if depressed for longer than predetermined time, it serves as a erasing function, and if depressed within the predetermined time, serves as a cursor shift key. Accordingly, the extension number "32" is erased by using the editing key 80. When performing the above processes, the number, "0331 745-0084", is displayed. Here, if the user depresses the dial key 70, the DTMF generator 22 is driven and the telephone number displayed on the LCD 30 is converted as a DTMF signal.

As above described, in a paging receiver, in case of confirming a received telephone number and performing automatic dialing of the confirmed telephone number, by considering a desired area code and erasing unnecessary data contained in the telephone number, error generated during dialing can be minimized and the stored telephone number can be maintained even if power is turned off, thereby improving reliability.

While the invention has been particularly shown and described with reference to a preferred embodiment, it will be understood by those skilled in the art that modifications in detail may be made without departing from the spirit and scope of the invention.

What is claimed is:

1. A method for automatically dialing in a paging system comprising a memory for storing a self-address into a first area of said memory, a received telephone number into a second area of said memory and a plurality of area codes into a third area of said memory, wherein said received telephone number is stored into said second area if said received telephone number is coincident with said self-address and thereafter, the stored telephone number is selected, edited and transmitted by a user depressing first to fourth keys, wherein the telephone number is transmitted as a dual tone multi-frequency signal generated through a telephone transmitter, said method comprising the steps of:

selectively displaying the stored telephone number corresponding to a number of depressions of said first key on display means when said first key is depressed;

if said displayed telephone number comprises an unwanted digit, moving a cursor displayed by said display means one digit by depressing a second key for a first period being less than a predetermined time and changing said displayed telephone number by deleting a displayed digit flagged by said cursor by depressing said second key for a second period being one of equal to and greater than said predetermined time;

if the area code is not desired for transmitting, converting the displayed telephone number into a dual tone multi-frequency signal when said third key is depressed, and transmitting said dual tone multi-frequency signal to the telephone transmitter;

if the area code is desired for transmitting, selectively displaying the area code, corresponding to a number of depressions of said fourth key, on said display means when said fourth key is depressed;

if said displayed telephone number and area code comprises said unwanted digit, moving the cursor said one digit by depressing the second key for the first period and changing the displayed telephone number and area code by deleting said digit flagged by said cursor by depressing said second key for the second period; and converting the displayed telephone number and area code into the dual tone multi-frequency signal when said third key is depressed, and transmitting said dual tone multi-frequency signal to the telephone transmitter.

2. The method for automatically dialing in a paging system as claimed in claim 1, wherein said memory is an electrically erasable and programmable read only memory capable of protecting stored data when power of said paging system is turned off.

3. A method for automatically dialing from a paging receiver having a dial key, said method comprising the steps of:

displaying first data of a received telephone number stored in a first area of a memory by depressing a read key;

displaying second data, along with said displayed first data, corresponding to an area code stored in a second area of the memory by depressing an area key;

changing said displayed first and second data by moving a displayed cursor one digit by depressing an edit key for a first duration and deleting a displayed digit marked by the cursor by depressing the edit key for a second duration; and combining and converting said displayed first and second data into a dual tone multi-frequency signal when said dial key is depressed and transmitting said dual tone multi-frequency signal to a telephone transmitter.

4. The method as claimed in claim 3, wherein said memory is an electrically erasable and programmable read only memory capable of protecting stored data when power of said paging receiver is turned off.

5. A paging receiver for automatically dialing a received telephone number of a caller by analyzing a received radio frequency signal, comprising:

receiver means for demodulating the received radio frequency signal and shaping demodulated waveforms to convert the shaped signal into a digital signal;

control circuit means connected to said receiver means, comprising first memory means for storing said received telephone number and dual tone multi-frequency generator means for converting a telephone number to be transmitted into a dual tone multi-frequency signal, for controlling automatic dialing;

a second memory means connected to said control circuit means, for storing first and second specific self-addresses into a first area of said second memory means, storing said received telephone number into a second area of said second memory means and storing at least one area code into a third area of said second memory means;

read key means connected to said control circuit means, for supplying a read key instruction to said control circuit means, for successively selecting one of a plurality of said received telephone numbers stored in said second area;

area key means connected to said control circuit means, for supplying an area key instruction to said control circuit means for successively selecting one of a plurality of area codes stored in said third area;

display means connected to said control circuit means for displaying said selected one of the plurality of received telephone numbers and said selected one of the plurality of area codes according to a control signal of said control circuit means;

dial key means connected to said control circuit means, for supplying a dial key instruction to said control circuit means for combining and converting the selected one of the plurality of received telephone numbers and selected one of the plurality of area codes into a dual tone multi-frequency signal by driving said dual tone multi-frequency generator means;

editing key means connected to said control circuit means, for supplying a first editing key instruction to said control circuit means for moving a cursor displayed by said display means in response to activating the editing key means for a first duration of time, and for supplying a second editing key instruction to said control circuit means for deleting a digit, corresponding to the position of said cursor, of the displayed telephone number and area code in response to activating the editing key means for a second duration of time; and speaker means connected to said control circuit means, for converting said dual tone multi-frequency signal into a dual tone multi-frequency tone and supplying said dual tone multi-frequency tone to a telephone transmitter.

6. A method of automatically dialing from a paging receiver, comprising the steps of:

reading a received telephone number comprising a local telephone number and an area code from a memory and displaying said received telephone number on a display;

editing the received telephone number by moving a displayed cursor one digit by depressing an edit key for a first time period being less than a predetermined time period and deleting a digit flagged by the cursor by depressing the edit key for a second time period being one of equal to or greater than said predetermined time period; and automatically dialing the edited telephone number in response to a dial signal.

7. The method of claim 6, wherein the step of reading the received telephone number comprises selecting the received telephone number from a plurality of received telephone numbers stored in the memory by user activation of a read key.

8. The method of claim 6, wherein the step of editing the received telephone number comprises deleting a telephone extension number from the received telephone number.

9. The method of claim 6, wherein the step of automatically dialing the edited telephone number comprises generating a dual tone multi-frequency signal corresponding to the edited telephone number and applying the dual tone multi-frequency signal to a telephone transmitter.

10. The method of claim 6, wherein said memory is an electrically erasable and programmable read only memory protecting stored data when power to the paging receiver is turned off.

11. A method of automatically dialing in a paging receiver, comprising the steps of:

reading and displaying a received telephone number and a corresponding area code from a memory;

editing the displayed telephone number and corresponding area code by moving a cursor on a display one digit by depressing an edit key for a first duration and deleting a digit marked by the cursor by depressing the edit key for a second duration; and dialing the edited telephone number and area code.

12. The method of claim 11, wherein said memory is an electrically erasable and programmable rear only memory protecting stored data when power to the paging receiver is turned off.

13. The method of claim 11, wherein the step of reading and displaying the received telephone number comprises selecting the received telephone number from a plurality of received telephone numbers stored in the memory by user activation of a read key.

14. The method of claim 11, wherein the step of editing the displayed telephone number comprises deleting a telephone extension number from the received telephone number.

15. The method of claim 11, wherein the step of dialing the edited telephone number comprises generating a dual tone multi-frequency signal corresponding to the edited telephone number and applying the dual tone multi-frequency signal to a telephone transmitter.

16. A paging receiver for receiving a radio frequency signal and automatically dialing a received telephone number transmitted in said received radio frequency signal, said paging receiver comprising:

receiver means for demodulating the received radio frequency signal, shaping a waveform from the received radio frequency signal, and converting the shaped signal into a digital signal;

display means for displaying the received telephone number;

editing means for editing the received telephone number displayed on said display means by moving a displayed cursor one digit by depressing an edit key for a first period being less than a predetermined time and deleting a digit flagged by the cursor by depressing the edit key for a second period being one of equal to and greater than said predetermined time;

control means for controlling automatic dialing of the edited telephone number, said control means comprising a random access memory to first store the received telephone number and a dual tone multi-frequency generator for producing a dual tone multi-frequency signal corresponding to the edited telephone number; and dial key means for supplying a dial signal via user activation to the control circuit, said control circuit responding by driving the dual tone multi-frequency generator to produce the dual tone multi-frequency signal to be generated through a telephone transmitter.

17. The paging receiver of claim 16, further comprising an electrically erasable and programmable read only memory to also store the received telephone number, said electrically erasable and programmable read only memory protecting said second stored data when power to the paging receiver is turned off.

18. The paging receiver of claim 17, further comprising:

read key means for providing a read key signal to the control circuit to select said received telephone number from a plurality of received telephone numbers stored in said electrically erasable and programmable read only memory.

19. The paging receiver of claim 17, further comprising:

area key means for providing an area key signal to the control circuit to select an area code from a plurality of area codes stored in the electrically erasable and programmable read only memory.

20. A paging receiver for automatically dialing a received telephone number of a received radio frequency signal, said paging receiver comprising:

receiver means for demodulating the received radio frequency signal, shaping a waveform from the received radio frequency signal, and converting the shape signal into a digital signal;

control means for controlling automatic dialing of the received telephone number, said control means comprising a random access memory to first store the received telephone number and a dual tone multi-frequency generator producing a dual tone multi-frequency signal corresponding to the received telephone number;

display means for displaying the received telephone number;

editing key means for providing an editing signal to the control circuit, said control circuit responding by editing the received telephone number by moving a cursor displayed by said display means one digit in response to depressing an edit key for a first duration of time and deleting a digit marked by the cursor in response to depressing the edit key for a second duration of time; and dial key means for supplying a dial signal via user activation to the control circuit, said control circuit responding by driving the dual tone multi-frequency generator to produce the dual tone multi-frequency signal corresponding to the edited telephone number to be generated through a telephone transmitter.

21. The paging receiver of claim 20, further comprising an electrically erasable and programmable read only memory to also store the received telephone number, said electrically erasable and programmable read only memory protecting said second stored data when power to the paging receiver is turned off.

22. The paging receiver of claim 21, further comprising read key means for providing a read key signal to the control circuit to select said received telephone number from a plurality of received telephone numbers stored in said electrically erasable and programmable read only memory.

23. The paging receiver of claim 21, further comprising area key means for providing an area key signal to the control circuit to select an area code from a plurality of area codes stored in the electrically erasable and programmable read only memory.

* * * * *

UNITED STATES PATENT AND TRADEMARK OFFICE
CERTIFICATE OF CORRECTION

PATENT NO. : 5,280,516
DATED : Jan. 18, 1994
INVENTOR(S) : Jong-Jin Jang

It is certified that error appears in the above-indentified patent and that said Letters Patent is hereby corrected as shown below:

| | | |
|---|---|---|
| Column 1, | Line 14, | after "form", delete ","; |
| Column 3, | Line 46, | after "code", insert --and--; |
| Column 4, | Line 3, | before "map", insert --the--; |
| | Line 29, | after "as", change "message" to --messages--; |
| | Line 33, | after "if", delete "a"; |
| | Line 42, | after "dialing", insert --,--; |
| Column 5, | Line 6, | before "message", insert --a--; |
| | Line 15, | after "exists" (the first occurrence), change "or not" to --is determined-- and after "exists," (the second occurrence), change "reads out the finally" to --the--; |
| | Line 16, | after "number", change "among" to --is read from--; |
| | Line 66, | after "520", insert --that dial key 70 has been depressed--; |

UNITED STATES PATENT AND TRADEMARK OFFICE
CERTIFICATE OF CORRECTION

PATENT NO. : 5,280,516
DATED : Jan. 18, 1994
INVENTOR(S) : Jong-Jin Jang

It is certified that error appears in the above-indentified patent and that said Letters Patent is hereby corrected as shown below:

Column 6,     Line 3,     before "exchange", insert --electronic-- and before "telephone", delete "electronic";

Line 55,     before "serves", delete ", it";

Line 62,     before "DTMF", change "as a" to --to--; and

Signed and Sealed this

Eighth Day of July, 1997

Attest:

*Attesting Officer*

BRUCE LEHMAN

*Commissioner of Patents and Trademarks*